United States Patent
Bellinger

(10) Patent No.: US 12,152,670 B2
(45) Date of Patent: Nov. 26, 2024

(54) CLUTCH ASSEMBLY FOR AUTOMATED MANUAL TRANSMISSION

(71) Applicant: Cummins Inc., Columbus, IN (US)

(72) Inventor: Steven M. Bellinger, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/661,189

(22) Filed: Apr. 28, 2022

(65) Prior Publication Data
US 2022/0252154 A1     Aug. 11, 2022

Related U.S. Application Data

(63) Continuation of application No. PCT/US2020/059629, filed on Nov. 9, 2020.

(60) Provisional application No. 62/935,206, filed on Nov. 14, 2019.

(51) Int. Cl.
    *F16H 61/688*     (2006.01)
    *F16H 61/04*     (2006.01)

(52) U.S. Cl.
    CPC ....... *F16H 61/688* (2013.01); *F16H 61/0403* (2013.01); *F16H 2061/0422* (2013.01); *F16H 2306/18* (2013.01)

(58) Field of Classification Search
    CPC .............. F16H 61/688; F16H 61/0403; F16H 2061/0422; F16H 2306/18
    See application file for complete search history.

(56) References Cited

U.S. PATENT DOCUMENTS

| | | | |
|---|---|---|---|
| 4,090,414 A * | 5/1978 | White | F16H 61/0272 74/731.1 |
| 5,121,820 A * | 6/1992 | Brown | F16H 61/143 192/3.3 |
| 5,315,901 A * | 5/1994 | Barnes | F16H 61/143 192/3.3 |
| 5,383,379 A * | 1/1995 | Niiyama | F16H 61/143 74/730.1 |
| 6,551,213 B2 | 4/2003 | Suzuki | |
| 6,832,978 B2 | 12/2004 | Buchanan et al. | |
| 7,077,784 B2 | 7/2006 | Banta, III et al. | |

(Continued)

FOREIGN PATENT DOCUMENTS

| | | |
|---|---|---|
| CN | 1664337 A | 8/2005 |
| EP | 2931546 B1 | 10/2015 |

(Continued)

OTHER PUBLICATIONS

International Search Report and Written Opinion, PCT Appln. No. PCT/US20/59629, Mar. 25, 2021, 12 pgs.

(Continued)

*Primary Examiner* — Colby M Hansen
(74) *Attorney, Agent, or Firm* — Taft, Stettinius & Hollister LLP

(57) ABSTRACT

A system, method and apparatus are disclosed for a clutch assembly for an automated manual transmission. The clutch assembly includes a dual power path. One power path connects a prime mover to the automated manual transmission via a wet clutch, and a second power path connects one of the prime mover and the automated manual transmission to a grounded connection for synchronizing the speed thereof for a gear change.

17 Claims, 3 Drawing Sheets

(56) References Cited

U.S. PATENT DOCUMENTS

| | | |
|---|---|---|
| 8,909,447 B2 | 12/2014 | Schneider et al. |
| 2003/0098189 A1 | 5/2003 | Donohue et al. |
| 2004/0079608 A1 | 4/2004 | Kupper et al. |
| 2009/0078070 A1 | 3/2009 | Earp et al. |
| 2012/0241275 A1 | 9/2012 | Simon et al. |
| 2016/0245401 A1 | 8/2016 | Nashio et al. |

FOREIGN PATENT DOCUMENTS

| | | |
|---|---|---|
| WO | 2014019576 A2 | 2/2014 |
| WO | 2015183937 A1 | 12/2015 |
| WO | 2017211343 A1 | 12/2017 |

OTHER PUBLICATIONS

Chinese Office Action, Chinese Appln. No. 2020800789711, 14 pgs., dated Sep. 15, 2023.

* cited by examiner

CLUTCH ASSEMBLY FOR AUTOMATED MANUAL TRANSMISSION

CROSS-REFERENCE TO RELATED APPLICATION

The present application is a continuation of PCT Application No. PCT/US20/59629 filed on Nov. 9, 2020, which claims the benefit of the filing date of U.S. Provisional App. No. 62/935,206 filed on Nov. 14, 2019, which are incorporated herein by reference.

BACKGROUND

The present application relates generally to clutch assemblies for automated manual transmissions ("AMT") and related apparatuses, methods, systems, and techniques.

Current approaches to automated manual transmissions in powertrains suffer from a number of shortcomings and unmet needs. For example, in contrast to automatic transmissions with torque converters, AMTs employ dry clutches due to, among other reasons, cost effectiveness and upshift capability. However, compared to automatic transmissions with torque converters, the torque interrupts associated with an AMT make execution of gear changes more difficult in some situations, such as at low speeds, and in particular on steep grades or soft road surfaces. Furthermore, AMTs have reduced low speed maneuverability and lower capability to creep for extended durations due to the inability of dry clutches to dissipate heat and the tendency to be more prone to wear.

Wet clutches have not been incorporated into AMTs since it is common practice to open the primary clutch and decouple the engine from the transmission during the synchronization process, particularly during upshifts. This practice makes the use of a wet clutch infeasible with an AMT given it has inherently higher drag as compared to a traditional dry clutch when in the open or released state. Therefore, there remains a substantial need for the unique apparatuses, methods, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

Exemplary embodiments include unique apparatus, methods, systems and techniques for a clutch assembly with dual power paths and at least one wet clutch that can be used for connection of an AMT with a prime mover. One power path controls power flow from the prime mover to the AMT, and the other power path is grounded to the prime mover or AMT to decelerate the prime mover or AMT and synchronize the prime mover or AMT speed for the gear change. Further, in embodiments in which the AMT is connected to the grounded connection, the input shaft to the AMT can be grounded to eliminate or reduce gear rattle and noise, vibration, and harshness (NVH) whenever the transmission is in neutral and the engine is at or near low idle speed. These conditions may also occur, for example, during cylinder deactivation and/or skipfire conditions. Further embodiments, forms, objects, features, advantages, aspects, and benefits shall become apparent from the following description and drawings.

DETAILED DESCRIPTION OF ILLUSTRATIVE EMBODIMENTS

Figure 1A:
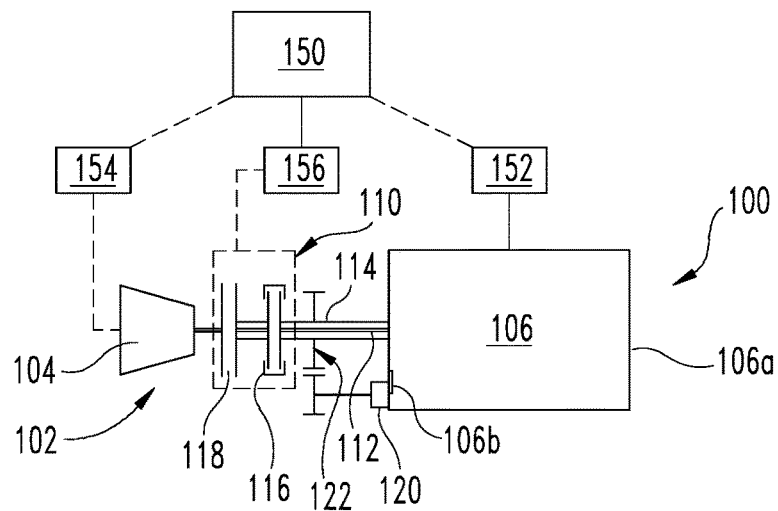
FIG. 1A is a schematic diagram illustrating certain aspects of an exemplary clutch assembly for a powertrain including an automated manual transmission system and a prime mover.

With reference to FIG. 1A, there is illustrated a partially diagrammatic view of an exemplary vehicle system 100. In the illustrated embodiment, vehicle system 100 includes a powertrain 102 comprising an automated manual transmission (AMT) 104, a prime mover 106, and a wet clutch assembly 110 between AMT 104 and prime mover 106. The powertrain 102 may also include additional components which are not illustrated such as one or more energy storage devices, differentials, axles, and ground engaging wheels. Vehicle system 100 may be provided in a number of vehicles including, for example, a semi tractor-trailer, bus, delivery truck, service truck, construction machine, or off-road vehicle.

In the illustrated embodiment, the powertrain 102 of vehicle system 100 includes a prime mover 106 in the form of an internal combustion engine which can provide torque for vehicle propulsion. Other embodiments contemplate a prime mover 106 such as an electric motor, a range-extended electric vehicle system, and a parallel or series hybrid type arrangement with an engine and motor/generator(s). If provided as an internal combustion engine, the prime mover 106 may be provided as a four-stroke, compression ignition (CI) type with multiple cylinders and corresponding reciprocating pistons coupled to a crankshaft which is coupled to a flywheel that is coupled to a controllable clutch. In other embodiments, the engine may be of a different type, including different fueling, different operating cycle(s), different ignition, or the like. The engine may be provided with a number of related components which are not illustrated including an aftertreatment system, a mechanical accessory drive, an electrical accessory drive, and an air handling system, which may include one or more intake manifolds, exhaust manifolds, turbochargers, superchargers, air filters or other intake air and exhaust system components. Furthermore, it should be appreciated that in alternative embodiments some of the illustrated features may be absent and/or other optional devices and subsystems may be included (not shown).

In the illustrated embodiment, AMT 104 can operate in a drive mode and a manual mode. In the drive mode, the AMT undergoes shift events in an automated manner in response to acceleration commands from an accelerator pedal and/or cruise control system. In the manual mode, the AMT undergoes shift events in response to operator manipulation of, or input to, operator controls such as shift lever. The illustrated components permit the electronic control system (ECS) 150 of vehicle system 100 to system successfully complete a shift event by interfacing an engine control module (ECM) 152 with a transmission control module (TCM) 154 and a clutch control module (CCM) 156 and facilitating communication between these components. The ECS 150 may also include additional control modules which are not illustrated such a supervisory control module (SCM), or other control modules. In order to complete a shift event, ECS 150 establishes supervisor control over prime mover output (torque and speed) while arbitrating between driver requests, transmission controller requests, operating conditions, and other powertrain control requests along with the present and estimated future operating conditions of powertrain 102 of vehicle system 100.

In the illustrated embodiment, wet clutch assembly 110 include dual power paths 112, 114 that are selected for engagement with prime mover 106 depending on the desired operating conditions. A first power path 112 includes a first or primary clutch 116 that is operable to selectively connect an input shaft of AMT 104 to an output of prime mover 106. A second power path 114 includes a second clutch 118 that is operable to selective connect the output shaft of prime mover 106 to a grounded connection 120.

Figure 2:
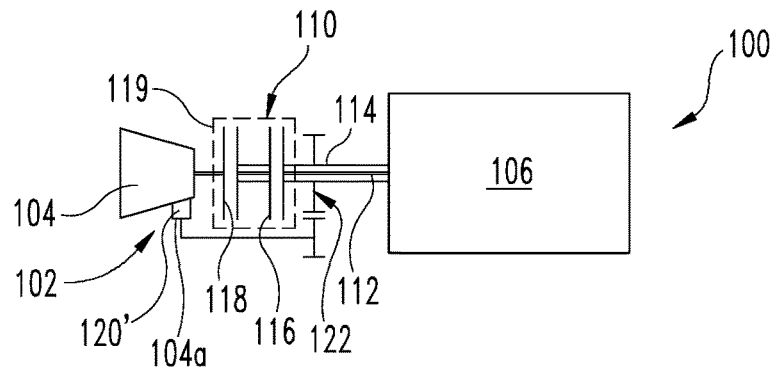
FIG. 2 is another schematic diagram illustrating certain aspects of another embodiment clutch assembly.

Grounded connection 120 can be any connection on vehicle system 100 which is a fixed, rigid connection that decelerates prime mover 106 to allow synchronizing of the prime mover speed for the gear upshift. Grounded connection 120 can be, for example, an engine block 106a or flywheel housing 106b for a prime mover 106 that is an engine. Alternatively, such as shown in FIG. 2, the grounded connection 120' of vehicle system 100' can be the transmission casing 104a of AMT 104.

First clutch 116 and second clutch 118 can include a housing 119 that houses the clutch components. Embodiments with separate clutch housing are also contemplated. A lubrication fluid is provided in the housing 119 so that the clutch components are submerged and operate as wet clutches, providing improved launch quality and low speed maneuverability than is available with the typical dry clutch connection between AMT 104 and prime mover 106.

Figure 1B:
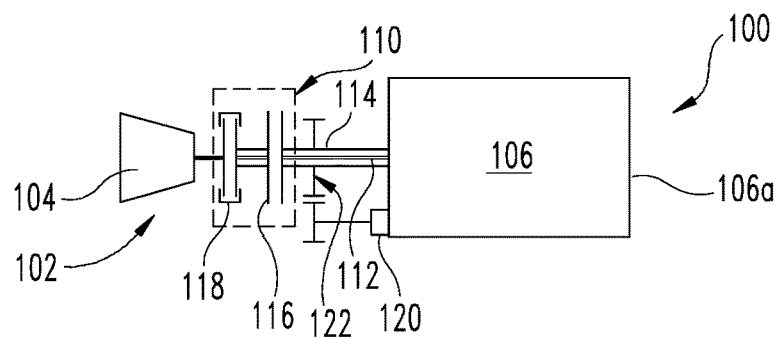
FIG. 1B is another schematic diagram illustrating certain aspects of the exemplary clutch assembly for the powertrain of FIG. 1A.

As can be seen in FIG. 1A, first clutch 116 is shown energized or engaged so that the output of prime mover 106 is connected to the input of AMT 104 via power path 112. Second clutch 118 is disengaged so that the output of prime mover 106 is not grounded. In FIG. 1B, second clutch 118 is engaged to couple second power path 114 to the output of prime mover 106. The output of prime mover 106 is connected to grounded connection 120 through a connection arrangement, such as gears 122 or other suitable connection, when second clutch 118 is engaged. First clutch 116 is disengaged so that the output of prime mover 106 is not connected to the input of AMT 104. Therefore, when first clutch 116 is de-energized or disengaged, energizing or engaging of second clutch 118 couples the output from prime mover 106 to the grounded connection 120 so that prime mover 106 decelerates.

The clutches 116, 118 can be cooled by integration with the cooling system and/or lubrication system for prime mover 106, which would eliminate a need for a separate cooling system for the wet clutch components. The number of friction elements of clutches 116, 118 can be sized according to the platform of prime mover 106, and could be optimized around specific torque requirements for each of the power paths 112, 114 of the clutch assembly 110.

It shall be appreciated that the ECM 152, TCM 154, CCM 156, and other control modules of the ECS 150 may also be referred to as control units or controllers in some applications and may be provided in self-contained housings. The ECM 152, TCM 154, and CCM 156 and other control modules of the ECS 150 may be provided in the form of microprocessor-based or microcontroller-based circuitry which are configured to execute operating logic to perform the acts, methods, processes, and techniques disclosed herein as well as various control, management, and/or regulation functions. The operating logic may be provided in the form of program instructions stored in a non-transitory memory medium, dedicated hardware such as a hardwired state machine, analog calculating machines, or combinations thereof. The control modules of the ECS may be implemented in a number of physically separate devices, or a single device and may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or electrical components.

In general, ECS 150 provides supervisory control over the operation of ECM 152, TCM 154, and CCM 156 during a gear shift event. For example, at the start of an upshift event for AMT 104, ECS 150 can send a command to CCM 156 to de-energize or disengage first clutch 116 and energize or engage second clutch 118 to engage the prime mover to the grounded connection 120 and ramp down the speed of prime mover 106 to a synchronous speed suitable for engagement with the scheduled gear for the upshift. ECS 150 can then send a command to CCM 156 to de-energize or disengage second clutch 118 and re-energize or engage first clutch 116 to connect the output of prime mover 106 to the input of AMT 104.

Figure 3:
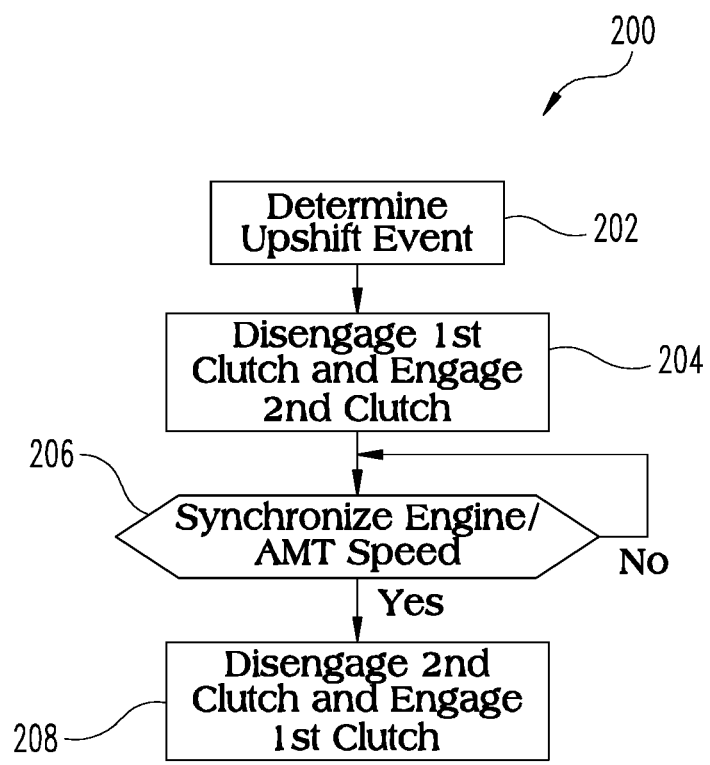
FIG. 3 is a schematic diagram illustrating certain aspects of exemplary procedure for operation of the clutch assembly according to the present disclosure to selectively connect the automated manual transmission system to the prime mover.

With reference to FIG. 3, there is illustrated a schematic diagram illustrating certain aspects of an exemplary shift event process 200 which may be automated or initiated by an operator command to a shift lever associated with a transmission. At operation 202, ECS 150 detects an upshift event. The detection may occur, for example, may be generated in response to an operator input to a shift lever or other vehicle control information from ECM 152 and/or TCM 154.

At operation 204, the first clutch 116 is disengaged. Simultaneously, at operation 204, the second clutch 118 is engaged to the grounded connection 120. At conditional 208, it is determined if the engine speed has obtained a synchronous speed. If conditional 206 is NO, process 200 continues with the second clutch 118 engaged to the grounded connection 120. If conditional 206 is YES, procedure 200 continues at operation 208 to disengage the second clutch 118, and to re-engage the first clutch 116 to couple the output of prime mover 106 to the input of AMT 104.

It shall be appreciated that the operations illustrated and described in connection with FIG. 3 may provide a number of benefits for control over a vehicle system such as vehicle system 100. In certain forms, a wet clutch assembly 110 can be employed in the vehicle operation using an AMT 104 while allowing the vehicle system 100 to be able to creep for extended durations and to maintain vehicle performance while making gear changes at low speeds, steep grades, and/or soft road surfaces. Clutch assembly 110 may be employed in powertrains with electronically assisted shift systems or brake activated upshift capability, or as a stand-alone solution to improve upshift performance in powertrains that employ AMTS that lack engine brakes (or have poorly responding engine brakes) or lack variable geometry turbine technology.

Figure 4A:
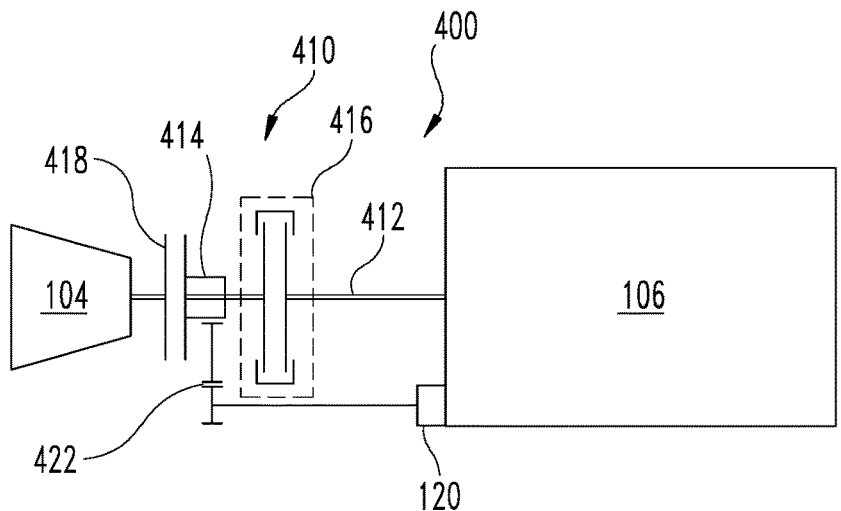
FIG. 4A is a schematic diagram illustrating certain aspects of another exemplary clutch assembly for a powertrain including an automated manual transmission system and a prime mover.

With reference to FIG. 4A, there is illustrated a partially diagrammatic view of another exemplary vehicle system 400. In the illustrated embodiment, vehicle system 400 is similar to vehicle system 100 and includes powertrain 102 comprising AMT 104 and prime mover 106. Vehicle system 100 includes a clutch assembly 410 between AMT 104 and prime mover 106. Clutch assembly 410 include dual power paths 412, 414 that are selected for engagement with AMT 104 depending on the desired operating conditions. A first power path 412 includes a first or primary clutch 416 that can be a wet clutch assembly. First clutch 416 is operable to selectively connect an input shaft of AMT 104 to an output of prime mover 106. A second power path 414 includes a second clutch 418 that is operable to selective connect the input shaft of AMT 104 to a grounded connection 120.

As discussed above, grounded connection 120 can be any connection on vehicle system 400 which is a fixed, rigid connection that decelerates and/or grounds the AMT 104 to allow synchronizing of the AMT speed for the gear upshift. Grounded connection 120 can also be used to ground the input shaft of AMT 104 during a neutral gear state with the engine at or near low idle speed to reduce or eliminate NVH in powertrain 102.

First clutch 416 can include a housing that houses the clutch components. A lubrication fluid can be provided in the housing so that the clutch components are submerged and operate as wet clutches, providing improved launch quality and low speed maneuverability than is available with the typical dry clutch connection between AMT 104 and prime mover 106. Second clutch 418 can be a wet clutch as discussed above with respect to clutch 118, or can be a dry clutch that is controlled electronically. Second clutch 418 can be a smaller, less expensive clutch than first clutch 416. In one embodiment, second clutch 418 is incorporated within the AMT 106. In one embodiment, second clutch 418 is a separate, stand-alone clutch from first clutch 416.

Figure 4B:
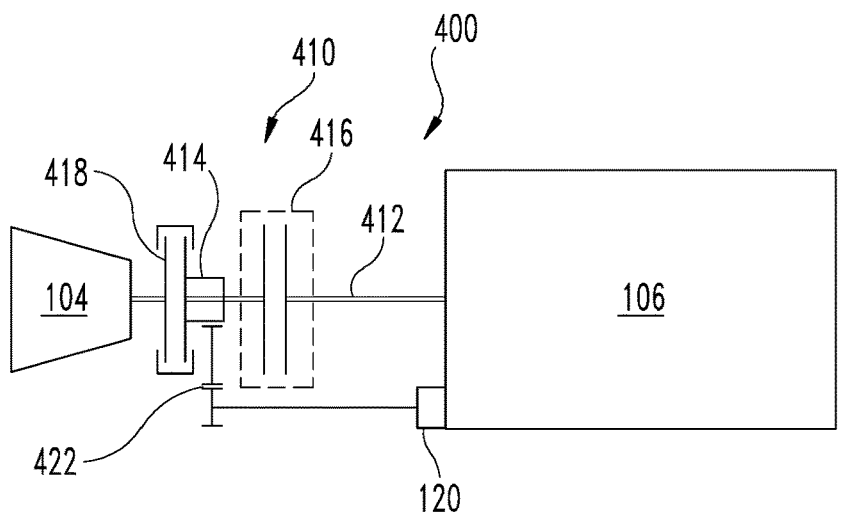
FIG. 4B is another schematic diagram illustrating certain aspects of the exemplary clutch assembly for the powertrain of FIG. 4A.

As can be seen in FIG. 4A, first clutch 416 is shown energized or engaged so that the output of prime mover 106 is connected to the input of AMT 104 via power path 412. Second clutch 418 is disengaged so that the output of AMT 104 is not grounded. In FIG. 4B, second clutch 418 is engaged to couple second power path 414 to the input of AMT 104. The input of AMT 104 is connected to grounded connection 120 through a connection arrangement, such as gears 422 or other suitable connection, when second clutch 418 is engaged. First clutch 416 is disengaged so that the output of prime mover 106 is not connected to the input of AMT 104. Therefore, when first clutch 416 is de-energized or disengaged, energizing or engaging of second clutch 418 couples the input to AMT 104 to the grounded connection 120 so that the input shaft to AMT 104 decelerates and/or stopped from rotating.

Figure 5:
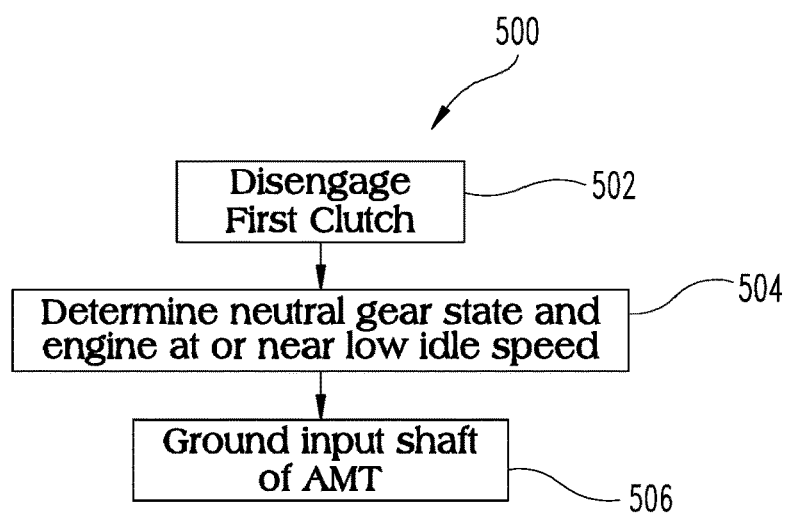
FIG. 5 is a schematic diagram illustrating certain aspects of exemplary procedure for operation of the clutch assembly of FIG. 4A to selectively connect the automated manual transmission system to the grounded connection.

With reference to FIG. 5, there is illustrated a schematic diagram illustrating certain aspects of an exemplary grounding process 500 which may be automated or initiated by an operator command to a shift lever associated with a transmission. At operation 502, the first clutch 416 is disengaged. Simultaneously or shortly thereafter, at operation 504, ECS 150 detects a neutral gear state with the engine at or near low idle speed. In certain embodiments, the ECS 150 may detect a CDA/skipfire event. The detection may occur, for example, may be generated in response to vehicle control information from ECM 152 and/or TCM 154.

In response to determining a neutral gear state and an engine speed at or near a low idle speed, at operation 506 the second clutch 418 is engaged so the input shaft to AMT 104 is connected to the grounded connection. The grounded connection of the AMT input shaft reduces or eliminates NVH during the neutral gear state with the engine at or near low idle speeds. The input shaft of the AMT 104 may also be grounded to provide speed synchronization for a gear shift event, in either forward or reverse gears.

Various aspects of the present disclosure are contemplated. According to one aspect, a powertrain includes an automated manual transmission and a prime mover. The powertrain also includes a clutch assembly including first power path for connecting the prime mover to the automated manual transmission and a second power path for connecting one of the prime mover and the automated manual transmission to a grounded connection to decelerate the one of the prime mover and the automated manual transmission.

In one embodiment, the first power path includes a first clutch and the second power path includes a second clutch. In one embodiment, the first clutch and the second clutch are located in a housing and are submerged in fluid to provide a wet clutch assembly. In one embodiment, the second clutch connects an input shaft of the automated manual transmission to the grounded connection, and the grounded connection is on the prime mover. In one embodiment, the first clutch is a wet clutch and the second clutch is a dry clutch.

In one embodiment, the powertrain includes a controller configured to select the first power path to drive the transmission with the prime mover and to select the second power path during a gear upshift event. In one embodiment, the controller is configured to select the first power path after selecting the second power path in response to a speed of the prime mover obtaining a synchronized speed suitable for the gear upshift.

In one embodiment, the grounded connection is on the prime mover. In one embodiment, the grounded connection is an engine block of the prime mover. In one embodiment, the grounded connection is a flywheel housing of the prime mover.

In one embodiment, the grounded connection is on the transmission. In one embodiment, the grounded connection is a casing of the transmission.

According to another aspect of the present disclosure, a method includes operating a vehicle system including an automated manual transmission; determining an upshift event for the vehicle system; disengaging a prime mover of the vehicle from the automated manual transmission; engaging one of the prime mover and the automated manual transmission to a grounded connection to decelerate the one of the prime mover and the automated manual transmission; and re-engaging the prime mover to the automated manual transmission in response to the one of the prime mover and the automated manual transmission obtaining a speed that is synchronized for engagement with a next gear of the automated manual transmission.

In one embodiment, the automated manual transmission is connectable to the prime mover with a first clutch, and the prime mover is connectable to the grounded connection with a second clutch. In one embodiment, the first clutch and the second clutch are wet clutches.

In one embodiment, the grounded connection is connected to the prime mover. In one embodiment, the grounded connection is connected to the transmission.

In one embodiment, the automated manual transmission is connectable to the prime mover with a first clutch, and an input shaft of the automated manual transmission is connectable to the grounded connection with a second clutch.

In one embodiment, the method includes disengaging the prime mover from the automated transmission occurs simultaneously with engaging the one of the prime mover and the automated manual transmission to the grounded connection.

According to another aspect of the present disclosure, an apparatus includes a clutch assembly for selectively connecting a prime mover to an automated manual transmission. The clutch assembly includes a first clutch that, when engaged, connects the prime mover to the automated manual transmission, and a second clutch that, when engaged, connects one of the prime mover and the automated manual transmission to a grounded connection to decelerate the one of the prime mover and the automated manual transmission.

In one embodiment, the clutch assembly includes at least one housing and the first clutch and the second clutch are submerged in fluid in the at least one housing.

In one embodiment, the grounded connection is part of the prime mover. In one embodiment, the grounded connection is part of the automated manual transmission.

In another aspect of the present disclosure, a method includes operating a vehicle system including an automated manual transmission; disengaging a prime mover of the vehicle from the automated manual transmission; determining a neutral gear state and an engine speed at or near low idle speed; and engaging the automated manual transmission to a grounded connection to ground the automated manual transmission during the neutral gear state and the engine at or near low idle speed.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A vehicle system comprising:
   a powertrain including an automated manual transmission and a prime mover; and
   a clutch assembly including first power path for connecting the prime mover to the automated manual transmission and a second power path for connecting one of the prime mover and the automated manual transmission to a grounded connection to decelerate the grounded one of the prime mover and the automated manual transmission.

2. The vehicle system of claim 1, wherein the first power path includes a first clutch and the second power path includes a second clutch.

3. The vehicle system of claim 2, wherein the first clutch and the second clutch are located in a housing and are submerged in fluid to provide a wet clutch assembly.

4. The vehicle system of claim 2, wherein the second clutch connects an input shaft of the automated manual transmission to the grounded connection, and the grounded connection is on the prime mover.

5. The vehicle system of claim 2, wherein the first clutch is a wet clutch and the second clutch is a dry clutch.

6. The vehicle system of claim 1, further comprising a controller configured to select the first power path to drive the transmission with the prime mover and to select the second power path during a gear upshift event.

7. The vehicle system of claim 6, wherein the controller is configured to select the first power path after selecting the second power path in response to a speed of the prime mover obtaining a synchronized speed suitable for the gear upshift.

8. The vehicle system of claim 1, wherein the grounded connection is on the prime mover.

9. The vehicle system of claim 8, wherein the grounded connection is an engine block of the prime mover.

10. The vehicle system of claim 8, wherein the grounded connection is a flywheel housing of the prime mover.

11. The vehicle system of claim 1, wherein the grounded connection is on the transmission.

12. The vehicle system of claim 11, wherein the grounded connection is a casing of the transmission.

13. An apparatus, comprising:
    a clutch assembly for selectively connecting a prime mover to an automated manual transmission, wherein the clutch assembly includes:
    a first clutch that, when engaged, connects the prime mover to the automated manual transmission; and
    a second clutch that, when engaged, connects one of the prime mover and the automated manual transmission to a grounded connection to decelerate the one of the prime mover and the automated manual transmission.

14. The apparatus of claim 13, wherein the clutch assembly includes at least one housing and at least the first clutch is submerged in fluid in the at least one housing.

15. The apparatus of claim 13, wherein the grounded connection is part of the prime mover.

16. The apparatus of claim 13, wherein the grounded connection is part of the automated manual transmission.

17. A method comprising:
    operating a vehicle system including an automated manual transmission;
    disengaging a prime mover of the vehicle from the automated manual transmission;

determining a neutral gear state with an engine speed at or near low idle speed; and engaging the automated manual transmission to a grounded connection to ground the automated manual transmission during the neutral gear state.

\* \* \* \* \*